(12) United States Patent
Ferguson et al.

(10) Patent No.: US 6,591,846 B1
(45) Date of Patent: Jul. 15, 2003

(54) WRAP AROUND BOOSTER

(75) Inventors: Mark Allen Ferguson, Rockholds, KY (US); Dwayne Alan Becknell, Barbourville, KY (US)

(73) Assignee: Jackson MSC, Inc., Barbourville, KY (US)

(*) Notice: Subject to any disclaimer, the term of this patent is extended or adjusted under 35 U.S.C. 154(b) by 186 days.

(21) Appl. No.: 09/713,452

(22) Filed: Nov. 15, 2000

(51) Int. Cl.⁷ ................................................. B08B 3/10
(52) U.S. Cl. ...................... 134/105; 134/108; 134/201
(58) Field of Search .......................... 134/105, 107, 134/108, 56 D, 57 D, 58 D, 201; 68/15

(56) References Cited

U.S. PATENT DOCUMENTS

| | | | |
|---|---|---|---|
| 2,545,966 A | * | 3/1951 | McQuitty |
| 2,635,173 A | * | 4/1953 | Radi |
| 2,698,739 A | * | 1/1955 | Haugen |
| 2,852,139 A | * | 9/1958 | Lowery |
| 3,356,827 A | * | 12/1967 | Angelery |
| 3,672,444 A | * | 6/1972 | Lowe |
| 3,923,073 A | | 12/1975 | Jacobs |
| 4,235,642 A | | 11/1980 | Federighi et al. |
| 4,242,569 A | * | 12/1980 | Kayser |
| 4,324,228 A | * | 4/1982 | Shippee |
| 4,326,551 A | | 4/1982 | Voorhees |
| 4,529,032 A | | 7/1985 | Molitor |
| 4,531,572 A | | 7/1985 | Molitor |
| 5,660,193 A | | 8/1997 | Archer et al. |
| 5,678,533 A | * | 10/1997 | Liljegren |

FOREIGN PATENT DOCUMENTS

| | | | |
|---|---|---|---|
| DE | 2716180 | * | 3/1978 |
| FR | 2324998 | * | 4/1977 |
| GB | 390362 A | | 12/1931 |
| GB | 2273147 | * | 6/1994 |
| GB | 2 312 493 A | | 10/1997 |

* cited by examiner

Primary Examiner—Frankie L. Stinson
(74) Attorney, Agent, or Firm—Ohlandt Greeley Ruggiero & Perle, LLP

(57) ABSTRACT

The present invention relates to a wrap around booster (10), and more specifically, the present invention relates to a wrap around booster (10) for use with a high temperature dishwashing machine (40). The wrap around booster (10) heats the water of the dishwashing machine (40) from approximately 110–140° F. to at least 150° F. in the wash tank (11) and at least 180° F. in the rinse tank (26). This is accomplished by keeping a relatively constant volume of water in the rinse tank (26) containing the wrap around booster (10), which maintains the rinse tank water at least 180° F. The rinse tank water surrounds the wash tank (11). The warmer water in the rinse tank (26) surrounding the wash tank (11) therefore heats the water contained in the wash tank (11) through convection. Therefore, one heating system does the work of two heating systems. Because there is no heating system inside the wash tank (11), the entire tank of water can be dumped and then the water is replenished with the water used during the rinse step.

14 Claims, 6 Drawing Sheets

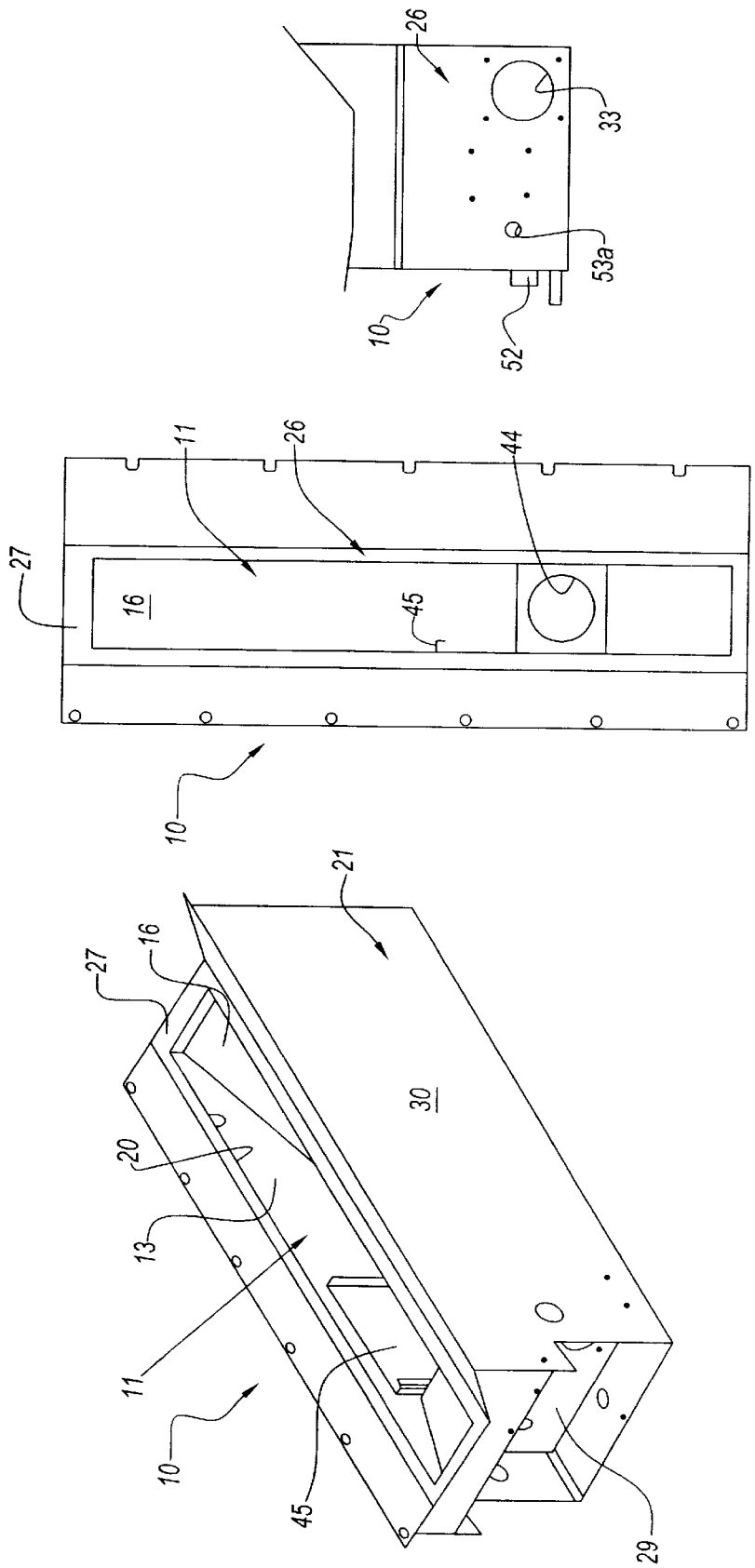

WRAP AROUND BOOSTER

BACKGROUND OF THE INVENTION

1. Field of the Invention

The present invention relates to a wrap around booster heater, and more specifically, the present invention relates to a wrap around booster heater for use with a dishwashing machine.

2. Description of the Prior Art

Generally, there are two types of dishwashing machines. Chemical dishwashing machines use high concentrations of chemicals to sanitize items, and high temperature dishwashing machines use high temperature water to sanitize items. Booster heaters are typically used in high temperature dishwashing machines to heat the water used in the dishwashing machines. The temperature of water flowing into a dishwashing machine is usually between 110 and 140° F. In a single temperature dishwashing machine, the temperature of the water must be raised to approximately 165° F. for both the wash cycle and the rinse cycle. In a dual temperature dishwashing machine, the temperature must be raised to at least 150° F. for the wash water and to at least 180° F. for the rinse water to comply with National Sanitation Foundation and the FDA requirements. A typical heating system used for high temperature sanitization requires a heating element that must be continually covered by water so the heating element will not become damaged. Therefore, a complete dumping of the water in the wash tank has not been possible in high temperature dishwashing machines. Prior art references have not shown complete dumping of the wash water in high temperature dishwashing machines.

U.S. Pat. No. 3,923,073 by Jacobs discloses means for preheating water of a domestic dishwasher by allowing the water to flow through a conduit before the water enters the dishwasher sump. Additional heat is supplied to the water entering the sump by means of a fill spout overlying the high end of a sloped trough and with the low end of the trough having an outlet communicating with the sump. A heating element is cradled within the trough so the water flowing through the trough heats to a predetermined temperature.

In U.S. Pat. No. 4,235,642 by Federighi et al., steam is used to heat the cold wash water directed to spray arms.

The use of a heat exchanger is disclosed in several patents. U.S. Pat. No. 4,326,551 by Voorhees discloses a heat recovery system including a heat exchanger in which fresh rinsing water flows in heat exchange relation with the excess washing solution from the sump before the rinsing water reaches the booster heater and the excess washing solution reaches the drain. Also disclosed is a booster heater separate from the dishwasher.

U.S. Pat. Nos. 4,529,032 and 4,531,572 by Molitor disclose methods and apparatus for recovery of waste energy. A heat exchanger is used to preheat incoming cold water for the hot water heater with the waste water suitable for discharge through the drain. The waste water is held in a holding tank and then passed through the heat exchanger during the rinse period, and heat is applied to the water in the hot water heater for the rinse water.

In U.S. Pat. No. 5,660,193 by Archer et al., warm, dirty cleaning liquid flows through the inner pipe of the heat exchanger into the drain channel in counterflow to the fresh water flowing in the outer pipe of the heat exchanger. Therefore, energy from the warm, dirty liquid is transferred to the fresh water in the heat exchanger.

Although U.S. Pat. No. 3,923,073 discloses a type of heat exchange, the heat exchange occurs from the trough to the water and not from one tank of water to another tank of water as in the present invention.

Unlike the prior art references, the present invention allows for complete dumping of the water contained in the wash tank of a high temperature dishwashing machine because the water in the wash tank is heated by the water in the rinse tank through convection, as described in more detail below.

SUMMARY OF THE INVENTION

A preferred embodiment heater tank assembly for use with a dishwashing machine includes a first tank, a second tank, and a heater. The first tank is capable of holding a first quantity of water at a first temperature and includes a plurality of side panels, an inlet, and an outlet. The second tank is capable of holding a second quantity of water at a second temperature and includes a plurality of side surfaces configured and arranged to surround the plurality of side panels of the first tank thereby allowing the second quantity of water to surround the plurality of side panels of the first tank. The second tank also includes an inlet and an outlet. The heater is in communication with the second quantity of water, and the heater raises the second temperature of the second quantity of water thereby also raising the first temperature of the first quantity of water by convection through the plurality of side panels of the first tank.

Another preferred embodiment heater tank assembly for use with a dishwashing machine includes a first tank, a second tank, and a heater. The first tank is capable of holding a first quantity of water and includes an inlet and an outlet. The second tank is capable of holding a second quantity of water and includes an inlet and an outlet, and the second quantity of water has a first temperature. The heater is in communication with the second quantity of water for raising the first temperature of the second quantity of water to a second temperature. The first quantity of water has a third temperature. The first tank includes a plurality of side panels and is configured and arranged to fit inside the second tank, whereby the second quantity of water surrounds the plurality of side panels of the first tank. The second temperature of the second quantity of water is higher than the third temperature of the first quantity of water. Therefore, the second quantity of water raises the third temperature of the first quantity of water to a fourth temperature by convection through the plurality of side panels thereby serving as a heater tank assembly.

In a preferred method of heating a first quantity of water of a first tank with a second quantity of water of a second tank in a dishwashing machine, a first tank including a plurality of side panels is placed inside a second tank configured and arranged to accept the first tank. The first tank is filled with a first quantity of water of a first temperature, and the second tank is filled with a second quantity of water of a second temperature. The second quantity of water contacts the plurality of side panels of the first tank. The second quantity of water is heated to a third temperature with a heater operatively connected to the second tank and submerged in the second quantity of water. The second quantity of water contacts the plurality of side panels of the first tank to heat the first quantity of water to a fourth temperature by convection through the plurality of side panels of the first tank.

BRIEF DESCRIPTION OF THE DRAWINGS

FIG. 2 is a perspective view of the wrap around booster shown in FIG. 1.

FIG. 3 is a top view of the wrap around booster shown in FIG. 1.

FIG. 4 is a left side view of the wrap around booster shown in FIG. 1.

DETAILED DESCRIPTION OF THE PREFERRED EMBODIMENTS

A preferred embodiment wrap around booster constructed according to the principles of the present invention is designated by the numeral 10 in FIGS. 1–5, 7, and 8.

Figure 7:
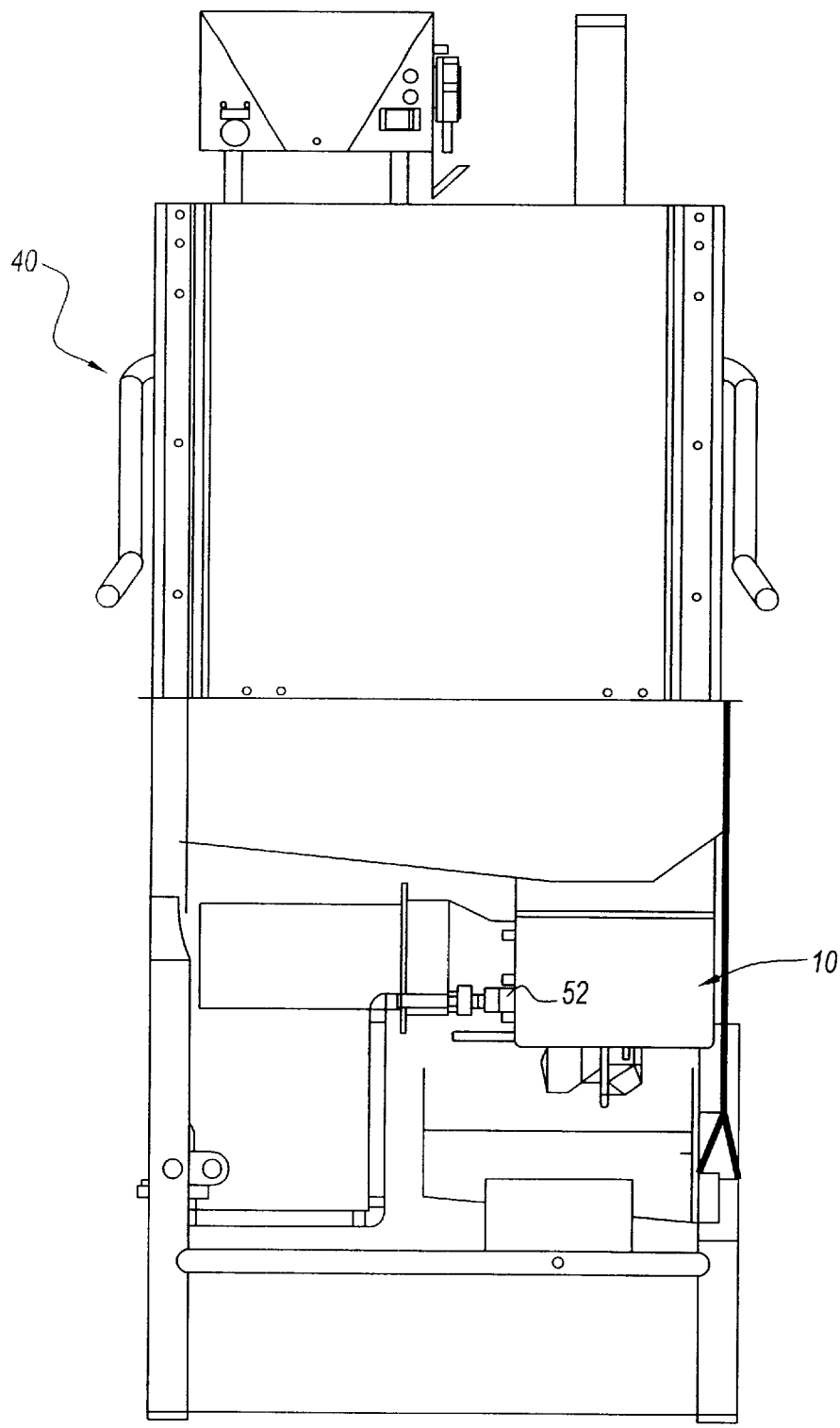
FIG. 7 is a front view of a typical dishwashing machine incorporating the wrap around booster shown in FIG. 1.
Figure 8:
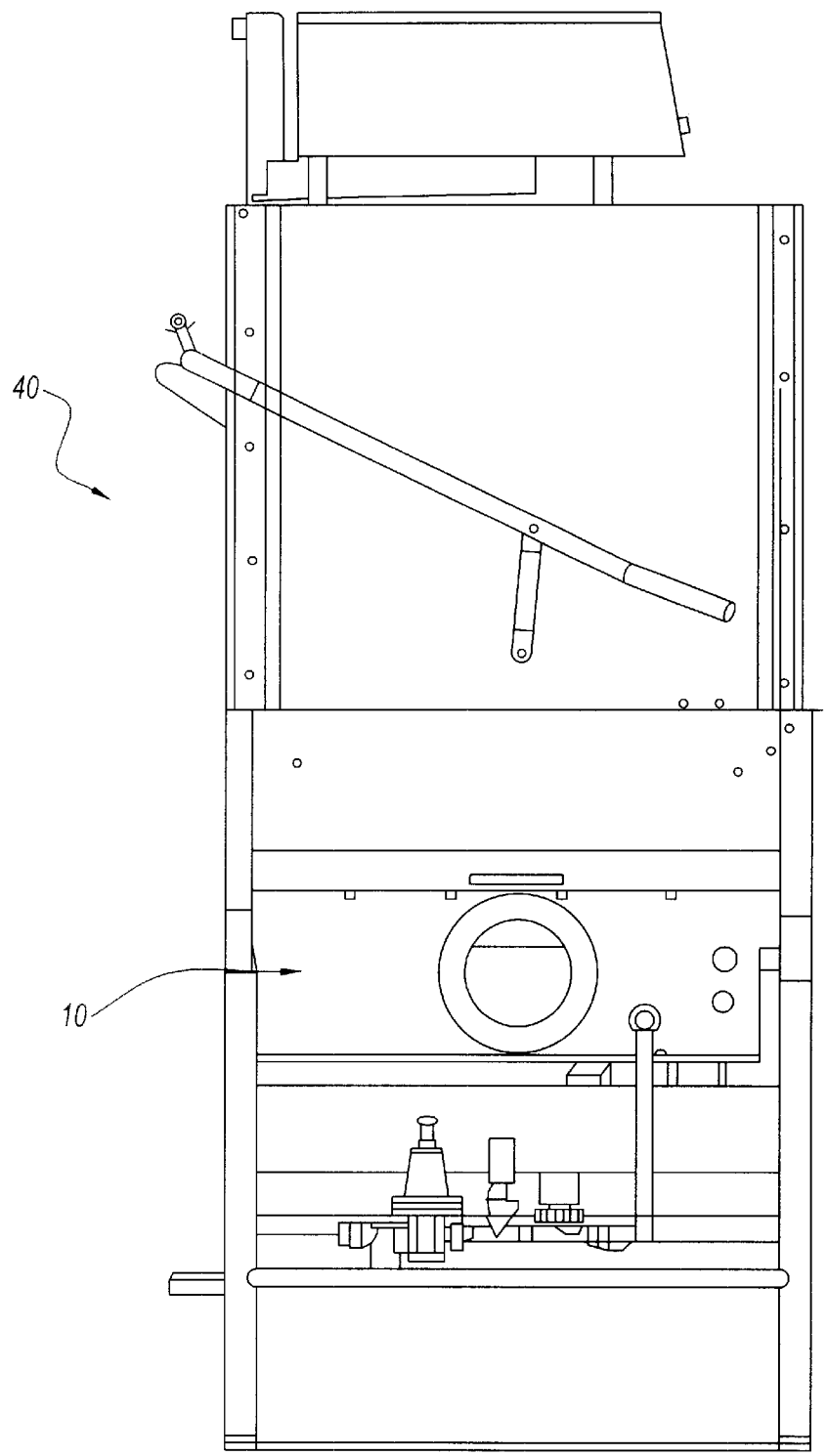
FIG. 8 is a left side view of a typical dishwashing machine incorporating the wrap around booster shown in FIG. 1.

The present invention relates to a wrap around booster 10, and more specifically, the present invention relates to a wrap around booster 10 for use with a dishwashing machine 40 (shown in FIGS. 7 and 8). FIGS. 1–5 show the preferred embodiment wrap around booster 10. The wrap around booster 10 includes a wash tank 11 and a rinse tank 26. The wash tank 11 includes a first side panel 13, a second side panel 14, a third side panel 15, a fourth side panel 16, and a bottom panel 17. The first side panel 13 and the third side panel 15 run parallel and are opposite one another, and the second side panel 14 interconnects one end of the first side panel 13 and the corresponding end of the third side panel 15. The fourth side panel 16 interconnects the other end of the first side panel 13 and the corresponding other end of the third side panel 15 and slopes downward at an angle to connect to the bottom panel 17. The bottom panel 17 is also connected to the bottom edges of each of the side panels. The top portion 12 of the wash tank 11, which is formed by the top edges of the side panels, is not enclosed and opening 20 allows access to the cavity 18 formed by the panels of the wash tank 11.

The rinse tank 26 includes a top surface 27, a first side surface 28, a second side surface 29, a third side surface 30, a fourth side surface 31 and a bottom surface 32. The first side surface 28 and the third side surface 30 are opposite one another as are the second side surface 29 and the fourth side surface 31, thus forming a rectangular shaped box with the bottom surface 32 connected to the bottom edges of each of the side surfaces. The surfaces form cavity 35. The rinse tank 26 is larger than the wash tank 11 so that the wash tank 11 fits within the cavity 35 of the rinse tank 26, and the top surface 27 encloses the top of the rinse tank 26 but not the top of the wash tank 11. Therefore, water contained in the rinse tank 26 surrounds the side panels and the bottom panel 17 of the wash tank 11.

Figure 1:
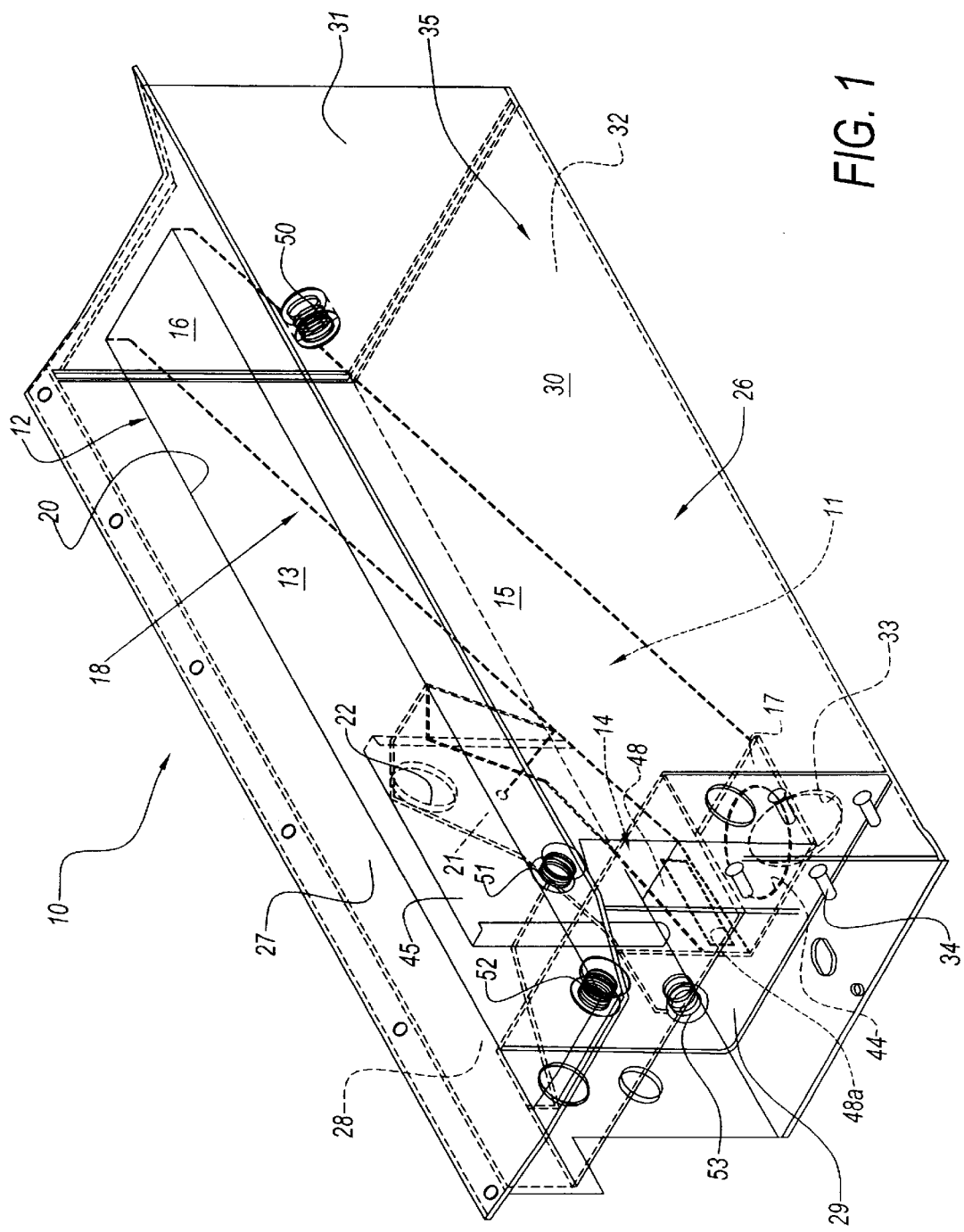
FIG. 1 is a perspective view with hidden lines of a wrap around booster constructed according to the principles of the present invention.
Figure 5:
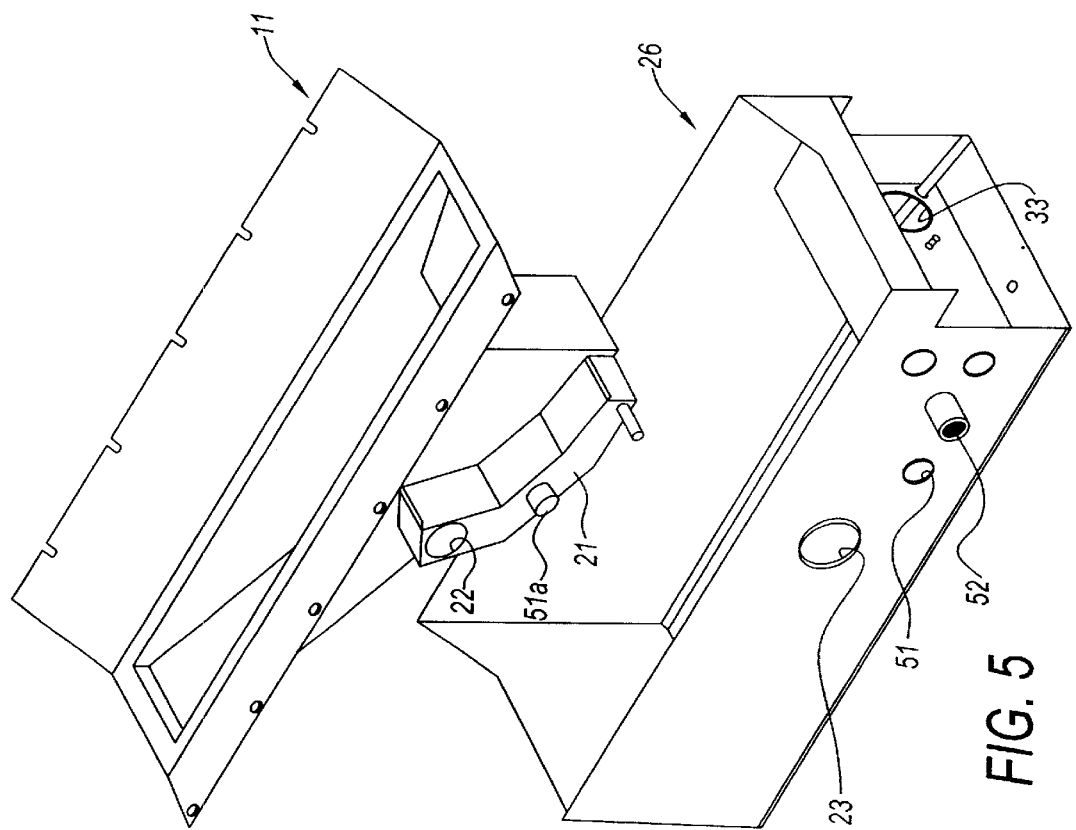
FIG. 5 is an exploded perspective view of the wrap around booster shown in FIG. 1.
Figure 6:
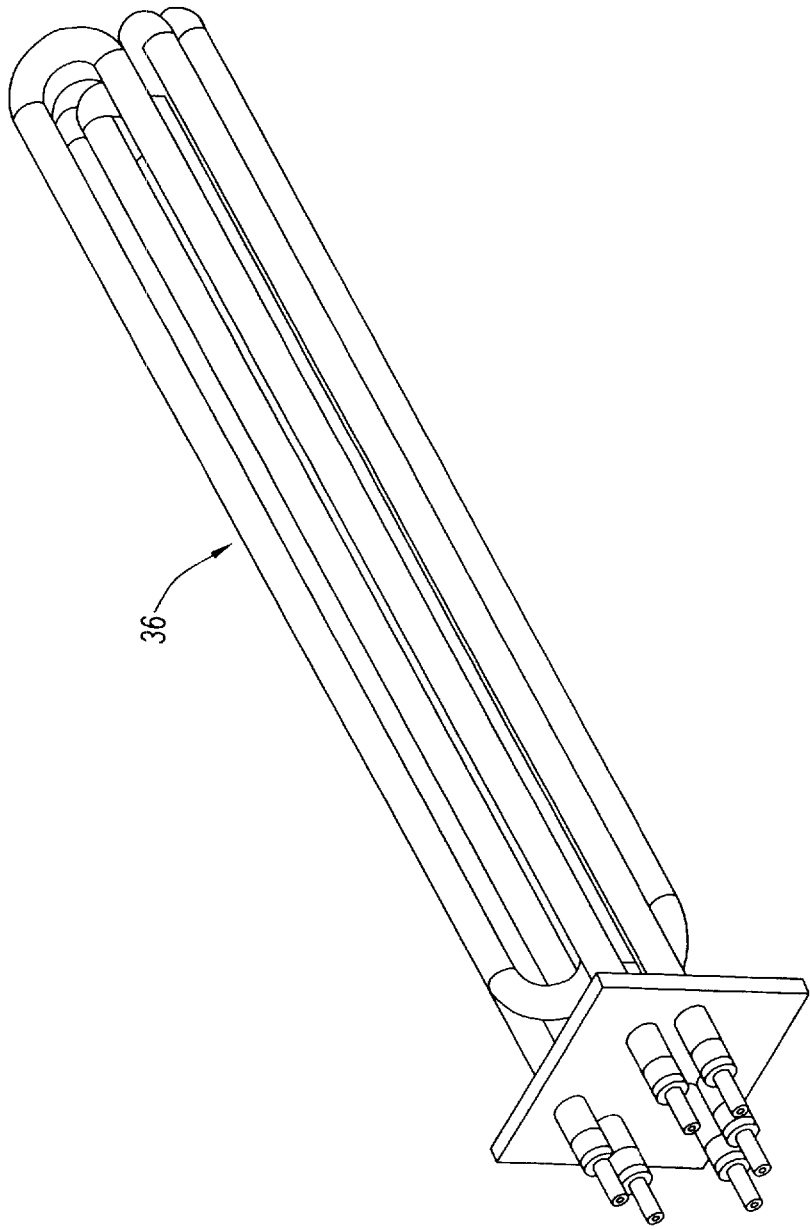
FIG. 6 is a perspective view of a heater element for use with the wrap around booster shown in FIG. 1.

The rinse tank 26 also includes a water inlet 52, a thermostat 53, and a water outlet 50. In the preferred embodiment, the water inlet 52 is located on the first side surface 28 proximate the juncture of the first side surface 28 and the second side surface 29. The thermostat 53 is located on the second side surface 29 proximate the water inlet 52 so that the thermostat 53 may activate the heater element 36 when cooler water enters the rinse tank 26 from the water inlet 52. The water outlet 50 is located on the fourth side surface 31 and allows water from the rinse tank 26 to flow into the dishwashing machine 40 by means well known in the art during the rinse cycle. Also included in the rinse tank 26 is a heater element opening 33, studs 34, and heater element 36 (shown in FIG. 6). In the preferred embodiment, the heater element opening 33 is located on the second side surface 29 proximate the juncture of the second side surface 29 and the third side surface 30. Studs 34 fasten the heater element 36 to the rinse tank 26, and the heater element 36 extends along the bottom surface 32 of the rinse tank 26 below the bottom panel 17 of the wash tank 11. In the preferred embodiment, the heater element 36 is a 12 KW heater element, such as a CHROMALOX® 12 KW at 208 volts or other heater element known in the art.

The wash tank 11 also includes a conduit 21 having an outlet 22, an intake pump 48 having opening 48a, and a wash water temperature hole 51. In the preferred embodiment, the intake pump 48 is located within conduit 21 proximate the bottom of the first side panel 13 near the second side panel 14, and the opening 48a is in fluid communication with cavity 18. The intake pump 48 draws water contained in cavity 18 of the wash tank 11 into opening 48a and pumps the water through the conduit 21 into the wash arms of the dishwashing machine 40. The conduit 21 extends from the intake pump 48 and includes an outlet 22, through which the water exits the conduit 21 and ultimately reaches the wash arms of the dishwashing machine 40 by means well known in the art. The rinse tank 26 includes an outlet 23, which is aligned with the outlet 22 so that the water in the wash tank 11 may be channeled to the wash arms. Pumping water from the wash tank 11 to the wash arms of the dishwashing machine 40 is commonly known in the art. The wash water temperature hole 51 actually extends from the first side surface 28 of the rinse tank 26 to the first side panel 13 of the wash tank 11 and allows a thermometer access to the water contained in the wash tank 11. The thermometer provides means to measure the temperature of the water contained within the wash tank 11.

Although the present invention is shown incorporated into a door type, high temperature dishwashing machine 40, the present invention can be used in any type of dishwashing machine. FIGS. 7 and 8 show a dishwashing machine 40 incorporating the wrap around booster 10. In the preferred embodiment, the dishwashing machine 40 is an OMEGA HT, however, other dishwashing machines known in the art may be used with the present invention.

In operation, the wrap around booster 10 heats the incoming water supply from the water inlet 52 into the rinse tank 26 from approximately 140° F. (approximately 110° F. in nursing homes) to at least 180° F. in a dual temperature dishwashing machine, as required by the National Sanitation Foundation and the FDA. This is accomplished by keeping a relatively constant volume of water in the rinse tank 26 containing the heater element 36, which maintains the rinse tank water at approximately 180–195° F. The thermostat 53 is located proximate the water inlet 52, and when the cooler water enters the rinse tank 26 from the water inlet 52, the thermostat 53 activates the heater element 36 to begin heating the water within the rinse tank 26. This ensures the temperature of the water in the rinse tank 26 does not drop significantly from mixing cooler water with the warmer water already contained in the rinse tank 26.

During the rinse cycle, water approximately 180–195° F. exits the rinse tank 26 through the water outlet 50 into the washing machine 40 by means well known in the art. Then, the water used during the rinse cycle cascades into the cavity 18 of the wash tank 11 through the opening 20 of the top portion 12. Therefore, the water used in the rinse cycle is used in the next wash cycle. Some heat loss may occur in the rinse water during the rinse cycle and as the water cascades into the cavity 18 of the wash tank 11. In addition, because the wash tank 11 includes opening 20, heat may escape from the water in the wash tank 11 through the opening 20. Some heat loss is acceptable because the temperature of the rinse water is required to be higher than the temperature of the wash water, however, the minimum temperature of 150° F. must be maintained for the water used in the wash cycle. Therefore, it is important to have a heating system in place for the water contained in the wash tank 11 to maintain this minimum temperature.

Because the water contained in the rinse tank 26 surrounds the wash tank 11, the warmer water in the rinse tank 26 heats the water contained in the wash tank 11 through convection and maintains the temperature in the wash tank 11 at a minimum of 150° F. In the preferred embodiment, the wash tank 11 is made of 16-gauge stainless steel, which allows the heat to transfer from the rinse water to the wash water, and the rinse tank 26 is made of 11-gauge stainless steel. Therefore, one heating system does the work of two heating systems. Because there is no heating system inside the wash tank 11, the entire tank of water can be dumped from the wash tank 11 during the wash cycle and then the water is replenished with the water used during the rinse cycle, as discussed above. This allows the "dump and fill" concept to be used in a high temperature sanitizing dishwashing machine.

A typical heating system used for high temperature sanitization requires a heating element 36 that must be continually covered by water so the heating element 36 will not become damaged. Therefore, a complete dumping of the water is not possible with the typical heating system. The present invention allows for complete dumping of the wash tank water because no heating element is present in the wash tank 11. This is referred to as "dump and fill," which was previously used only in chemical sanitization that did not require the use of hot water. Therefore, the wrap around booster allows for one less heater and one less set of controls than in the prior art and also allows for the "dump and fill" concept to be used in high temperature sanitization.

During the wash cycle, the intake pump 48 pumps water approximately 150–170° F. from the wash tank 11 into the wash arms of the washing machine 40, as discussed above, by means well known in the art. After the wash water has been applied to the items contained in the dishwashing machine 40, the wash water returns to the wash tank 11 by cascading into the wash tank 11 through the opening 20. All of the water contained in the wash tank 11 after the wash cycle is completed is allowed to drain through the drain hole 44 of the wash tank 11. The plunger system (not shown), which includes a rubber stopper, is lifted up by a solenoid to allow the dirty wash water to drain through the drain hole 44 to an accumulator (not shown). The accumulator catches any food removed during the wash cycle and allows the water to drain. A screen member (not shown) is held in place by a holding member 45, which extends along the first side panel 13 proximate the intake pump 48 and the conduit 21. The screen member is configured and arranged to cover the inlet of the intake pump 48 so that any remaining food or soil in the wash tank 11 is not allowed to enter the conduit 21 and contact the items contained in the dishwashing machine 40 during the next wash cycle. After the wash cycle is complete and the water is drained, the rinse cycle begins as discussed above.

Although the operation of the present invention is discussed with regard to a dual temperature dishwashing machine, it is understood that the present invention may be used in a single temperature dishwashing machine as well, as is well known in the art.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A heater tank assembly for use with a dishwashing machine, comprising:
   a. a first tank for holding a first quantity of water at a first temperature, said first tank including a plurality of side panels, an inlet, and an outlet;
   b. a second tank for holding a second quantity of water at a second temperature, said second tank including a plurality of side surfaces configured and arranged to surround said plurality of side panels thereby allowing said second quantity of water to surround said plurality of side panels of said first tank, said second tank including an inlet and an outlet; and
   c. a heater in communication with said second quantity of water, wherein said heater raises said second temperature of said second quantity of water thereby also raising said first temperature of said first quantity of water by convection through said plurality of side panels of said first tank, and wherein said first tank is a wash tank and said second tank is a rinse tank.

2. The heater assembly of claim 1, wherein said second quantity of water is only partially dispensed as to not expose said heater and said first quantity of water may be completely dispensed because said first quantity of water is not in communication with a heater.

3. The heater assembly of claim 1, wherein said first tank is made of a material capable of transferring heat.

4. The heater tank assembly of claim 3, wherein said first tank is made of 16-gauge stainless steel.

5. A heater tank assembly for use with a dishwashing machine, comprising:
   a. a first tank for holding a first quantity of water at a first temperature, said first tank including a plurality of side panels, an inlet, and an outlet;
   b. a second tank for holding a second quantity of water at a second temperature, said second tank including a plurality of side surfaces configured and arranged to surround said plurality of side panels thereby allowing said second quantity of water to surround said plurality of side panels of said first tank, said second tank including an inlet and an outlet; and
   c. a heater in communication with said second quantity of water, wherein said heater raises said second temperature of said second quantity of water thereby also raising said first temperature of said first quantity of water by convection through said plurality of side panels of said first tank, and wherein said first quantity of water is completely dispensed into a dishwashing machine for use during a wash cycle before being discarded.

6. A heater tank assembly for use with a dishwashing machine, comprising:
   a. a first tank for holding a first quantity of water at a first temperature, said first tank including a plurality of side panels, an inlet, and an outlet;
   b. a second tank for holding a second quantity of water at a second temperature, said second tank including a plurality of side surfaces configured and arranged to surround said plurality of side panels thereby allowing said second quantity of water to surround said plurality of side panels of said first tank, said second tank including an inlet and an outlet; and c. a heater in communication with said second quantity of water, wherein said heater raises said second temperature of said second quantity of water thereby also raising said first temperature of said first quantity of water by convection through said plurality of side panels of said first tank, and wherein said second quantity of water is partially dispensed into a dishwashing machine for use during a rinse cycle and then is dispensed into said first tank for use during a wash cycle before being discarded.

7. A heater tank assembly for use with a dishwashing machine, comprising:

a. a first tank for holding a first quantity of water, said first tank including an inlet and an outlet;

b. a second tank for holding a second quantity of water, said second tank including an inlet and an outlet, said second quantity of water having a first temperature;

c. a heater in communication with said second quantity of water for raising said first temperature of said second quantity of water to a second temperature; and d. said first quantity of water having a third temperature, said first tank including a plurality of side panels and being configured and arranged to fit inside said second tank, whereby said second quantity of water surrounds said plurality of side panels of said first tank, said second temperature of said second quantity of water being higher than said third temperature of said first quantity of water, wherein said second quantity of water raises said third temperature of said first quantity of water to a fourth temperature by convection through said plurality of side panels thereby serving as a heater tank assembly.

8. The heater tank assembly of claim 7, wherein said first tank is a wash tank and said second tank is a rinse tank.

9. The heater tank assembly of claim 7, wherein said first quantity of water may be completely dispensed because said first quantity of water is not in communication with said heater.

10. The heater tank assembly of claim 9, wherein said second quantity of water may be only partially dispensed to avoid exposing said heater.

11. The heater tank assembly of claim 7, wherein said second quantity of water may be only partially dispensed to avoid exposing said heater.

12. The heater tank assembly of claim 1, wherein said second quantity of water of said second tank is used in a rinse cycle of a dishwashing machine and then becomes said first quantity of water of said first tank for use in a wash cycle of said dishwashing machine before being discarded.

13. The heater tank assembly of claim 1, wherein said first tank is made of a material capable of transferring heat.

14. The heater tank assembly of claim 13, wherein said first tank is made of 16-gauge stainless steel.

* * * * *